United States Patent [19]

Cole

[11] Patent Number: 4,706,913
[45] Date of Patent: * Nov. 17, 1987

[54] VARIABLE CAMBER LEADING EDGE ASSEMBLY FOR AN AIRFOIL

[75] Inventor: James B. Cole, Mercer Island, Wash.

[73] Assignee: The Boeing Company, Seattle, Wash.

[*] Notice: The portion of the term of this patent subsequent to Oct. 9, 2001 has been disclaimed.

[21] Appl. No.: 658,674

[22] Filed: Oct. 9, 1984

Related U.S. Application Data

[63] Continuation-in-part of Ser. No. 474,652, Dec. 28, 1982, Pat. No. 4,475,702.

[51] Int. Cl.$^4$ .............................................. B64C 3/50
[52] U.S. Cl. ..................................... 244/214; 244/219
[58] Field of Search ............... 244/213, 214, 215, 219, 244/75 R; 74/569

[56] References Cited

U.S. PATENT DOCUMENTS

| | | |
|---|---|---|
| 1,773,530 | 8/1930 | Hannah . |
| 1,868,748 | 7/1932 | Hogan ................................ 244/214 |
| 1,917,428 | 7/1933 | Burnelli ............................. 244/215 |
| 2,786,907 | 3/1957 | Harris ................................. 74/569 |
| 3,089,666 | 5/1963 | Quenzler . |
| 3,716,209 | 2/1973 | Pierce . |
| 4,171,787 | 10/1979 | Zapel . |
| 4,247,065 | 1/1981 | Grob et al. ........................ 244/219 |
| 4,351,502 | 9/1982 | Statkus .............................. 244/215 |
| 4,475,702 | 10/1984 | Cole .................................. 244/219 |

FOREIGN PATENT DOCUMENTS

| | | |
|---|---|---|
| 0045988 | 2/1982 | European Pat. Off. . |
| 2006133 | 5/1979 | United Kingdom . |
| 2013593 | 8/1979 | United Kingdom . |

Primary Examiner—Galen L. Barefoot
Assistant Examiner—Rodney Corl
Attorney, Agent, or Firm—Hughes & Cassidy

[57] ABSTRACT

A variable camber leading edge device having a movable nose section and an upper flexible panel extending rearwardly from the nose section. To move the nose section between its upper cruise position and a high lift downwardly deflected position, there is attached to the nose section a generally arcuate cam track, having its forward and rear portions curving upwardly. The cam track is constrained to move in a generally arcuate path, but with a movable center of rotation, and is driven by a gear engaging a radially outward rear portion of the track.

12 Claims, 10 Drawing Figures

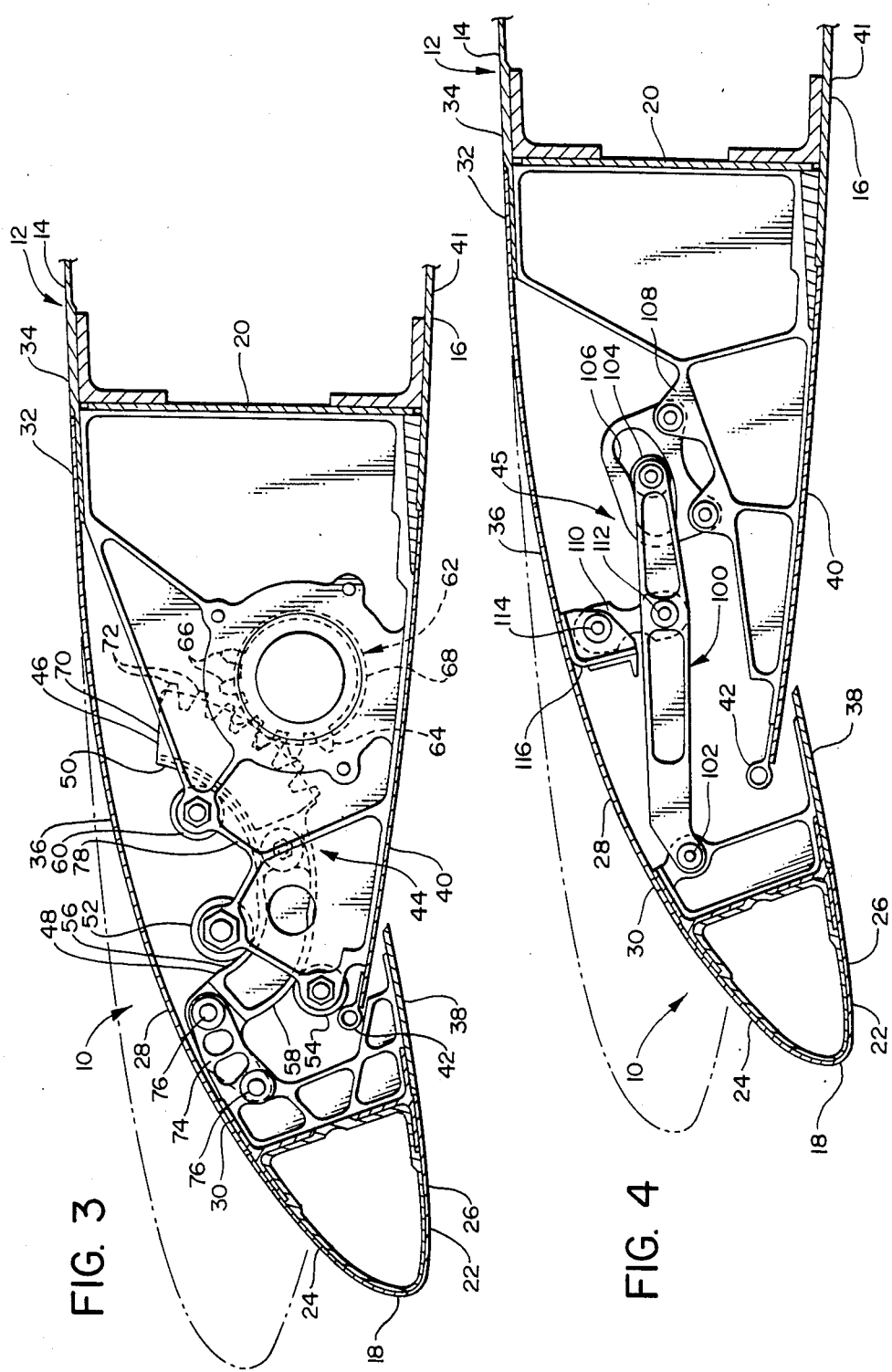

FIG. 10

TRACK CAM DEFINITION

| TRACK POSITION (θ DEG.) | E | | L | | M | | N | | H | |
|---|---|---|---|---|---|---|---|---|---|---|
| | X | Z | X | Z | X | Z | X | Z | X | Z |
| 0.00 | 7.735269 | 0.996035 | 8.647802 | 2.676791 | 10.096717 | 4.664137 | 6.160667 | 2.289107 | 3.407529 | 4.550000 |
| 2.224021 | 7.737386 | 0.998416 | 8.714456 | 2.642494 | 10.239402 | 4.572115 | 6.214150 | 2.351619 | 3.550824 | 4.717650 |
| 4.382720 | 7.744105 | 1.005236 | 8.782410 | 2.611343 | 10.378958 | 4.482154 | 6.272922 | 2.414855 | 3.700608 | 4.87952 |
| 6.475732 | 7.755954 | 1.015999 | 8.852224 | 2.583114 | 10.516032 | 4.394368 | 6.337234 | 2.478408 | 3.856651 | 5.035382 |
| 8.502448 | 7.773426 | 1.030203 | 8.924433 | 2.557567 | 10.651256 | 4.308847 | 6.407313 | 2.541871 | 4.018710 | 5.184972 |
| 10.099744 | 7.792084 | 1.043924 | 8.985218 | 2.538611 | 10.760186 | 4.241076 | 6.468638 | 2.593084 | 4.154638 | 5.301739 |
| 10.464387 | 7.796807 | 1.047185 | 8.999429 | 2.534248 | 10.785196 | 4.225383 | 6.483247 | 2.604737 | 4.186533 | 5.328063 |
| 12.449240 | 7.819698 | 1.061084 | 9.073104 | 2.505602 | 10.916372 | 4.133871 | 6.560873 | 2.663197 | 4.359859 | 5.464437 |
| 14.500906 | 6.838400 | 1.069485 | 9.142717 | 2.468204 | 11.043097 | 4.029439 | 6.637738 | 2.715637 | 4.538422 | 5.593879 |
| 16.618608 | 7.852479 | 1.072944 | 9.207591 | 2.422510 | 11.164365 | 3.912455 | 6.713467 | 2.762339 | 4.721943 | 5.716190 |
| 18.801831 | 7.861516 | 1.072046 | 9.267056 | 2.369009 | 11.279169 | 3.783329 | 6.787688 | 2.803606 | 4.910137 | 5.831180 |
| 20.199489 | 7.864423 | 1.069545 | 9.301179 | 2.331840 | 11.347191 | 3.696661 | 6.833149 | 2.826782 | 5.030003 | 5.899252 |
| 21.749902 | 7.864197 | 1.064903 | 9.334581 | 2.287862 | 11.416771 | 3.596825 | 6.880846 | 2.849400 | 5.161491 | 5.969532 |
| 23.583023 | 7.858422 | 1.056957 | 9.367174 | 2.232255 | 11.490170 | 3.473942 | 6.932657 | 2.871997 | 5.313990 | 6.045531 |
| 25.481771 | 7.846478 | 1.046716 | 9.393343 | 2.171378 | 11.556315 | 3.342060 | 6.981360 | 2.891432 | 5.468732 | 6.116857 |
| 27.446726 | 7.828074 | 1.034753 | 9.412592 | 2.105714 | 11.614432 | 3.201525 | 7.026717 | 2.908047 | 5.625571 | 6.183440 |
| 29.349744 | 7.804696 | 1.022515 | 9.423905 | 2.040268 | 11.660920 | 3.062356 | 7.065989 | 2.921388 | 5.774386 | 6.24150 |
| 30.498670 | 7.789703 | 1.015645 | 9.428993 | 2.000726 | 11.686052 | 2.977754 | 7.089219 | 2.928949 | 5.864447 | 6.274295 |
| 32.488656 | 7.767382 | 1.006435 | 9.439891 | 1.933998 | 11.729516 | 2.832060 | 7.133760 | 2.942909 | 6.025894 | 6.328767 |
| 34.412151 | 7.750786 | 1.000517 | 9.453486 | 1.871420 | 11.771964 | 2.692125 | 7.182519 | 2.957167 | 6.188923 | 6.378303 |
| 36.269830 | 7.740094 | 0.997266 | 9.470130 | 1.812515 | 11.813995 | 2.557630 | 7.235553 | 2.971309 | 6.353383 | 6.422857 |
| 38.062119 | 7.735463 | 0.996078 | 9.490152 | 1.756819 | 11.856174 | 2.428263 | 7.292911 | 2.984935 | 6.519123 | 6.462385 |
| 38.500000 | 7.735269 | 0.996035 | 9.495720 | 1.743343 | 11.866805 | 2.396686 | 7.307929 | 2.988216 | 6.560740 | 6.471478 |

VARIABLE CAMBER LEADING EDGE ASSEMBLY FOR AN AIRFOIL

CROSS REFERENCE TO RELATED APPLICATIONS

This is a continuation-in-part of a pending application filed as PCT/US 82/01797, and U.S. Ser. No. 474,652, filed Dec. 28, 1982, now U.S. Pat. No. 4,475,702.

BACKGROUND OF THE INVENTION

1. Technical Field

The present invention relates to airfoils, and more particularly to a variable camber leading edge assembly for an airfoil.

2. Background Art

A common way of modifying the lift characteristics of an airfoil for low speed operation is to use leading edge devices which either pivot or slide outwardly from the leading edge of the airfoil to a deployed position. With many such devices, there is a problem that during deployment there is an interruption of smooth airflow over the upper surface of the airfoil. Also, many such devices are not able to be deployed to intermediate positions while maintaining the proper flow of air over the airfoil.

Accordingly, there have appeared in the prior art various devices to vary the shape of the airfoil itself in a manner to vary the camber of the leading edge. Variable camber leading edges are particularly desirable in solving the airfoil stall problem for small, thin, sweptback wings which have good cruise performance, but require high lift devices to make their low speed performance acceptable. However, there is a problem of installing such variable camber leading edge devices on such wings since these thin wings have the least space available in which to house such devices.

Accordingly, it is an object of the present invention to provide a device to vary the camber of an airfoil, and particularly such a device used as a variable camber leading edge assembly. It is a more particular object to provide such an assembly with a flexible upper skin panel which is moved from a cruise position to a more curved high lift position, with the flexible panel having a desired aerodynamic contour throughout its path of travel between the upper cruise position and the downwardly deflected position, with the assembly being relatively compact, and with the major part of the aerodynamic load on the assembly being transmitted into the support structure so as to relieve loading on the drive mechanism of the assembly.

SUMMARY OF THE INVENTION

The leading edge assembly of the present invention is for an airfoil having an upper surface, a lower surface, a leading edge and a trailing edge. The assembly comprises a main support structure for the airfoil, and a nose section at the leading edge. There is an upper skin panel having a rear part connected to the structure, a forward part connected to the nose section, and an intermediate flexible panel portion extending between the rear part and the forward part.

There is a support and actuating means operatively connected between the nose section and the support structure to move the nose section about a general center of rotation between a first upper position where the flexible panel portion has a lesser degree of curvature and the nose section is more horizontally aligned to a second lower position where the flexible panel portion has a greater degree of curvature and the nose section is aligned in a more downward slant. Thus, the curvature of the flexible panel portion increases with movement of the nose section toward its second position.

The support and actuating means comprises a cam track having a forward end connected to the nose section and having a lengthwise axis curved in a generally arcuate configuration about the general center of rotation. There is cam track contact means connecting to the support structure and comprising a forward contact portion and a rear contact portion engaging the cam track at two spaced locations along the lengthwise axis to restrain angular movement of the cam track relative to the cam track contact means. The cam track has a forward cam track section engaging the forward contact portion for travel along a path having a forward and upward slant, and a rear cam track section engaging the rear contact portion for travel along a path having an upward and rearward slant.

There is a rotatably mounted drive gear member engaging the cam track at a drive location which is adjacent to and radially outwardly of the cam track section relative to the general center of rotation.

The lengthwise axis of the cam track at the forward cam section deviates at least partly from a true circular arc, in a manner that said general center of rotation shifts during movement of the nose section between the first and second positions, whereby a proper aerodynamic contour of the upper skin panel can be maintained.

Desirably, the drive gear member is adjacent the rear contact portion, and the rear cam track section comprises a gear segment engaging the drive gear member. The gear segment is arranged in a circular arc. Also, in the preferred form, the drive member has an axis of rotation which is coincident with an axis of rotation of a lower contact member of the rear contact portion.

The forward section of the cam track has a forward portion, a middle portion, and a rear portion. The middle portion of the forward section deviates from the arcuate configuration of the lengthwise axis of the cam track in a direction radially outwardly from the general center of rotation.

In the specific configuration shown herein, the forward contact portion comprises upper and lower cam rollers engaging upper and lower surfaces, respectively, of the forward cam track section. Likewise, the rear contact portion comprises upper and lower rollers engaging upper and lower cam surfaces of the rear cam track section.

As another feature of the present invention, there is locating means comprising a locating member having first and second end portions. The first end portion is pivotally connected to one of the nose section and the main support structure. The second end portion is operatively connected to cam means arranged to move the second end portion along a predetermined path as the nose section moves between its first and second positions. The locating means further comprises a locating link operatively connected between the locating member and the upper skin panel at a location intermediate the forward and rear parts of the skin panel.

More specifically, the first end of the locating member is pivotally connected to the nose section, and the second end of the locating member is connected to a cam member defining a cam path operatively engaging a matching cam member connected to the second end of the locating member. The cam member is connected to the main support structure.

Other features of the present invention will become apparent from the following detailed description.

DESCRIPTION OF THE DRAWINGS

FIGS. 3 and 5 are views similar to FIG. 1, but showing the leading edge assembly deflected downwardly at 20° and 38.5° angles, respectively;

FIGS. 4 and 6 are views similar to FIG. 2, showing the leading edge assembly deflected downwardly at angles of 20° and 38.5°, respectively;

FIG. 10 is a table giving coordinates for various point locations along the paths of movement illustrated in FIG. 9.

DESCRIPTION OF THE PREFERRED EMBODIMENT

Figure 1:
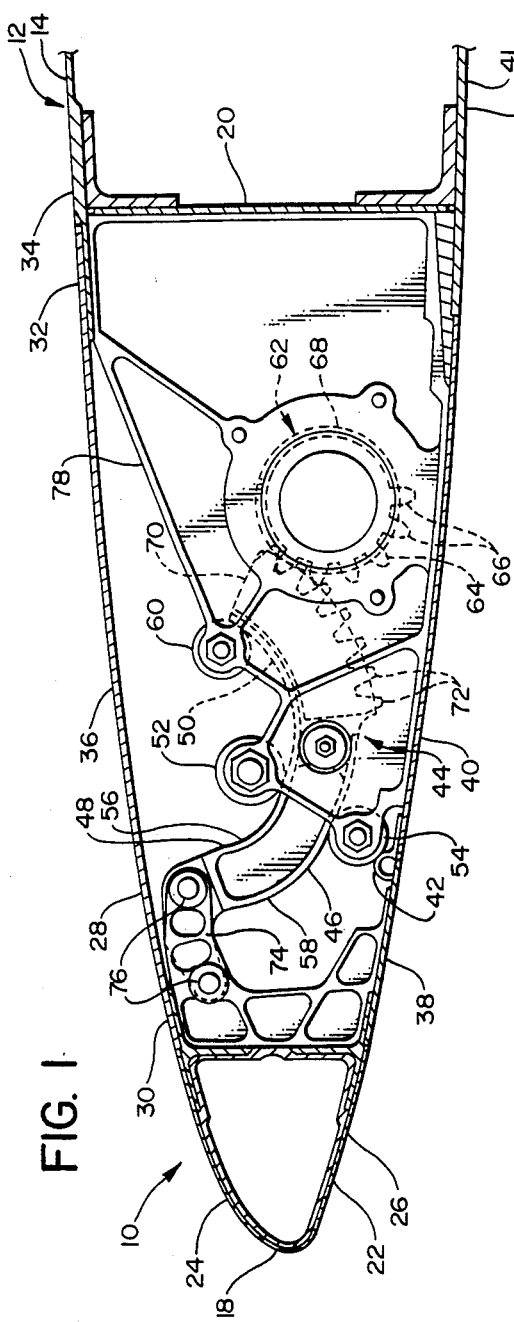
FIG. 1 is a cord-wise sectional view of an actuating assembly of the leading edge assembly of the present invention in its upper position for cruise mode.

The leading edge assembly 10 of the present invention forms the forward portion of a wing 12, only the forward portion which is shown. The wing 12 has an upper surface 14, a lower surface 16, a leading edge 18 and a trailing edge (not shown for ease of illustration). The wing 12 has a main support structure comprising a front spar 20 to which the leading edge assembly 10 is mounted. At the leading edge 18, there is a nose section 22 in the form of a substantially rigid beam extending in a spanwise direction along the leading edge 18. The nose section 22 has an upper surface 24 and a lower surface 26. There is a flexible upper skin panel 28 which has: a) a forward part 30 which is attached to the upper rear surface of the nose section 22 and blends into the upper surface 24 of the nose section 22; b) a rear part 32 which butts against, and is aligned with, the main upper skin 34 at the location of the front spar 20, and c) a flexible intermediate portion 36 which reaches between the front part 30 and the rear part 32.

The lower surface of the leading edge assembly 10 comprises a forward portion 38 connected to and extending rearwardly from the lower surface of the nose section 22, and a rear portion 40 which is a forward extension of the main lower skin section 41 at the lower rear part of the front spar 20. At the front edge of the rear portion 40, there is a seal 42 to close the small gap at the juncture of the lower skin portions 38 and 40.

Figure 5:
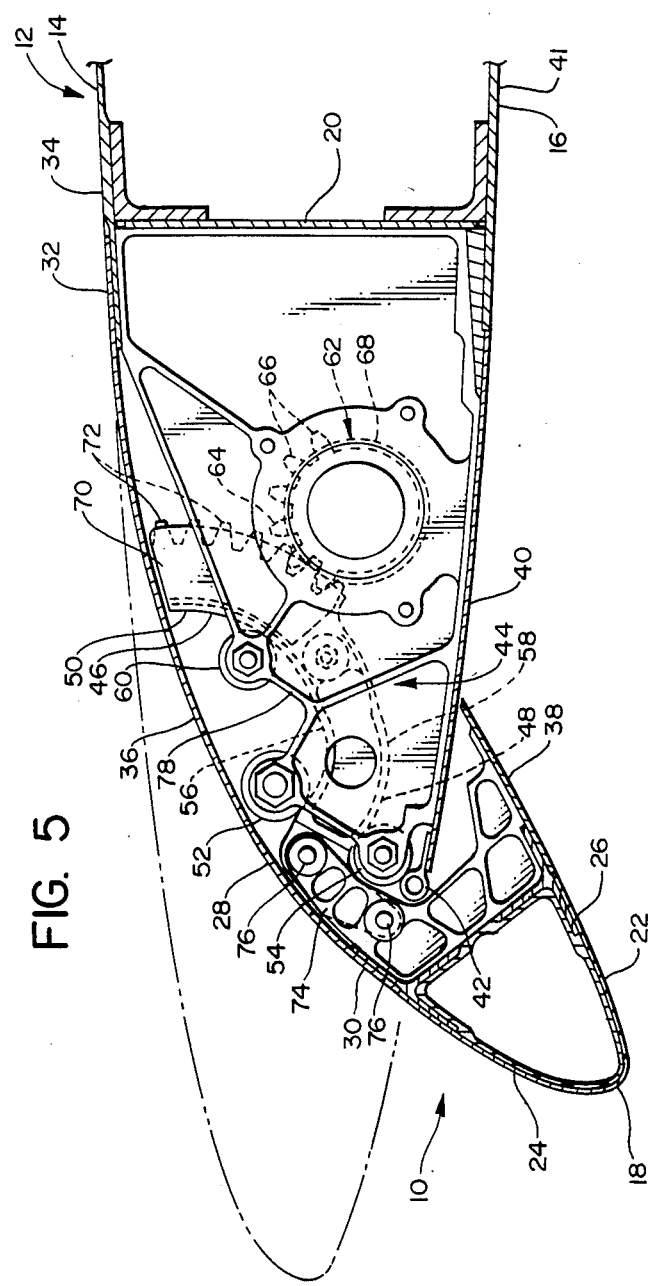

The support and actuating assembly of the present invention, generally designated 44, functions to move the nose section 22 from an upper cruise position shown in FIG. 1, through an intermediate position of FIG. 3, to a fully deflected high lift position, shown in FIG. 5. This is accomplished in a manner that as the assembly 10 moves from the position of FIG. 1 to that of FIG. 5, the curvature of the upper skin panel 28 progressively increases so as to assume a proper aerodynamic contour throughout the movement of the assembly 10 from its cruise configuration to its fully downwardly deflected position. During such downward movement, the forward lower skin portion 38 moves downwardly with the nose section 22 to separate from the rear portion 40, with the rear edge of the lower skin portion 38 moving rearwardly beneath the rear lower skin portion 40.

Figure 2:
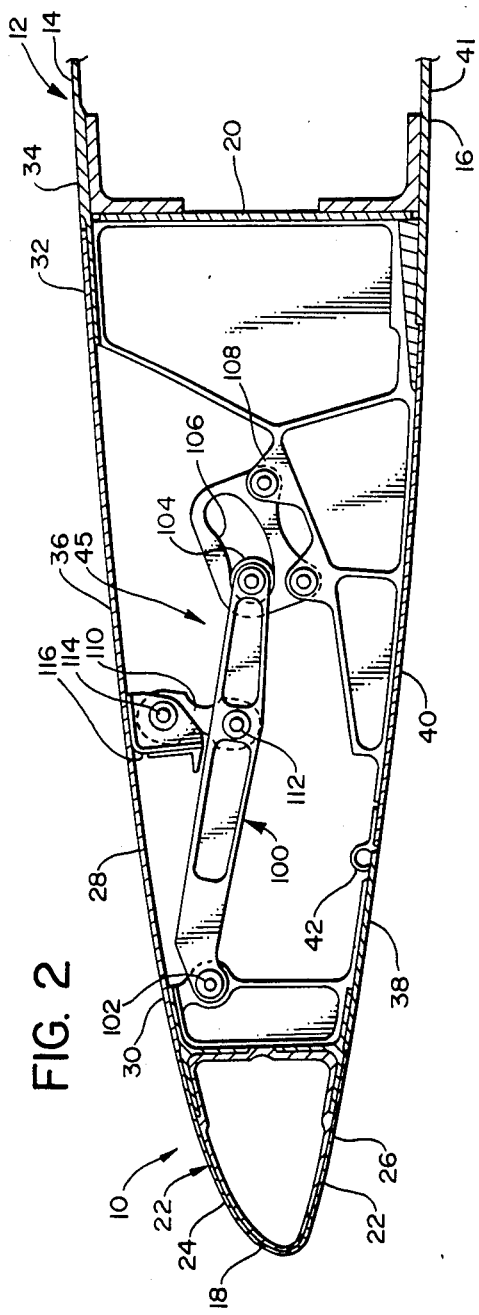
FIG. 2 is a cord-wise sectional view of a positioning device of the leading assembly of the present invention.
Figure 6:
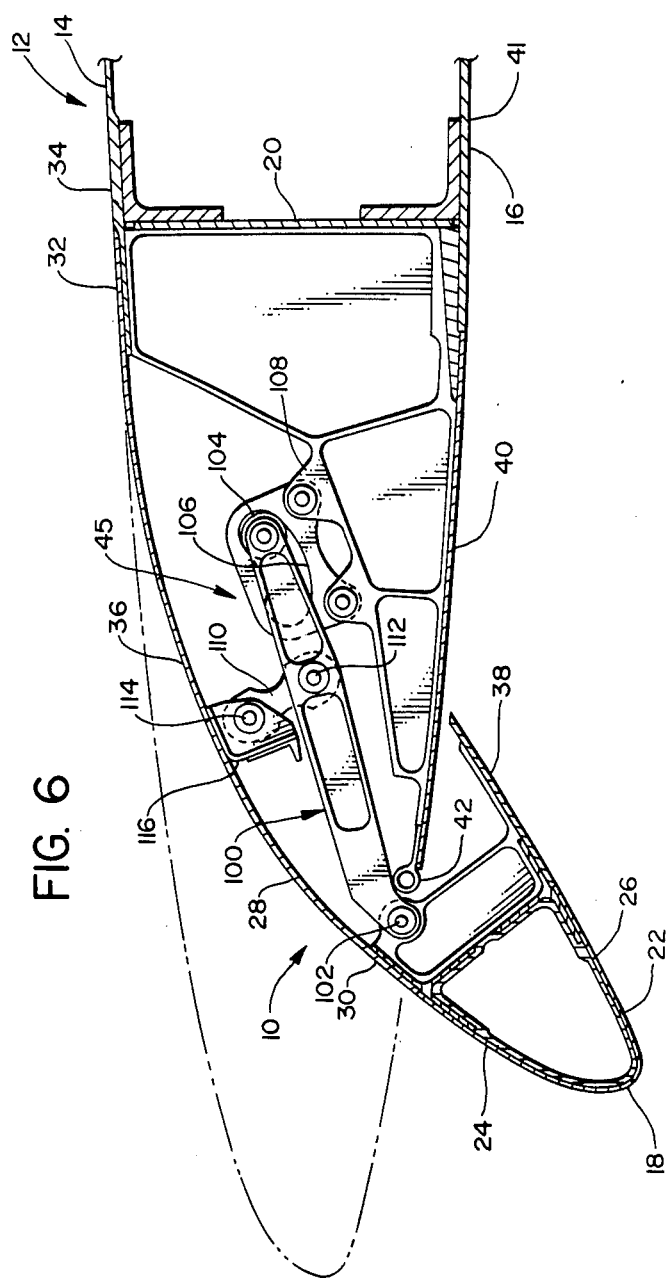

To properly locate and support the flexible intermediate portion 36 of the upper skin panel 28, there is illustrated in FIGS. 2, 4 and 6 a beam assembly, which functions as a locating device, generally designated 45. In the following description, there will first be a detailed description of the support and actuating assembly 44, after which the locating device 45 will be described.

The support and actuating assembly 44 comprises a generally arcuately shaped cam track 46, having a forward cam track portion 48 and a rear cam track portion 50. There is a forward cam track locating means comprising upper and lower cam rollers 52 and 54, engaging upper and lower cam track surfaces 56 and 58, respectively, of the forward track portion 48.

There is a rear locating and drive means comprising an upper cam roller 60, and a lower combined cam roller and drive gear 62. The upper rear cam roller 60 engages an upper surface of the rear cam track portion 50. The combined roller/drive member 62 comprises a gear portion 64 made up of gear teeth 66, and a roller portion having two circular surfaces 68.

The cam track 46 is made in right and left sections, spaced a short distance from one another. Thus, the teeth 66 of the roller/drive member 62 are positioned between the two sides of the roller surface 68 of the member 62. There is provided a gear segment 70 positioned between and bolted to the two sections of the cam track 46. This gear segment 70 has teeth 72 which engage the teeth 66 of the roller/drive member 62.

The forward end of the cam track 46 is formed to fit between a clevis 74, which is a part of the nose section 22, and these are rigidly interconnected at two connecting locations 76. The cam rollers 52, 54 and 60, and also the roller/drive member 62 are rotatably mounted to a stationary support rib 78 which is fixedly connected to and extends forwardly from the front spar 20.

Figures 8, 9:
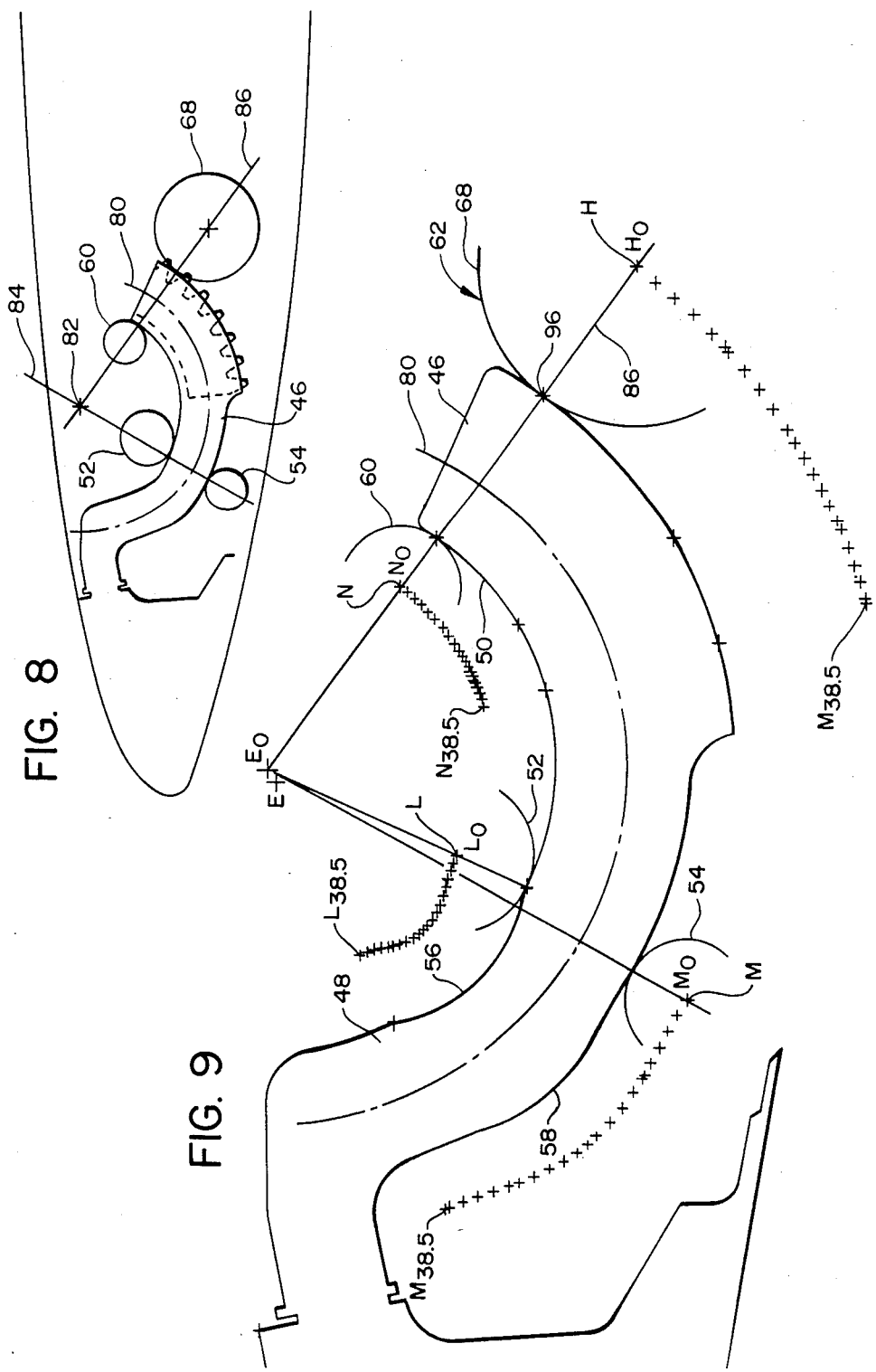
FIG. 8 is a schematic view of the actuating assembly of the present invention, and illustrating the positioning of the drive gear and the cam rollers.
FIG. 9 is a schematic view illustrating the paths followed by the cam rollers and the drive gear of the actuating assembly, where the cam track of the actuating assembly is presumed to be stationary, and the cam rollers and drive gear move relative to the cam track.

The cam track 46 has a generally arcuate configuration, and has a circumferential or lengthwise axis which, for purposes of illustration, has been drawn as a circular arc, indicated at 80 in FIG. 8, and having a center of curvature at 82. However, for reasons which will be explained more fully hereinafter, the actual configuration of the track 46 deviates slightly from a true circular arc so as to program the movement of the nose section 22 more precisely so as to obtain the proper degree of curvature of the upper skin panel 28 throughout its movement from the cruise position of FIG. 1, through the intermediate position of FIG. 3, to the full down position of FIG. 5, while maintaining proper engagement of the gear teeth 66 with the teeth 72 of the gear segment 70.

The cam rollers 52 and 54 are positioned substantially opposite one another relative to the circumferential axis 80, and the center axes of the rollers 52 and 54 are positioned along a line 84 that slants upwardly and rearwardly toward the center of curvature 82. The center axis of the upper cam roller 60 and the center axis of the roller/drive member 62 are positioned on a line 86 that extends upwardly and forwardly toward the center of curvature 82.

In the cruise position of FIG. 1, the track 46 is at its forwardmost position, so that the forward rollers 52 and 54 engage the lower rear portion of the forward cam track section 48, and the rear upper roller 60 and the roller/drive member 62 engage the upper rear portion of the rear cam track section 50. Although not illustrated herein, it is to be understood that the rollers 52, 54, 60 and 68 are arranged in a suitable support structure which has side load pads that engage lateral surfaces of the cam track 46 to keep the track 46 properly located relative to the roller 52, 54 and 60, as well as properly located relative to the roller/drive member 62. Also, the track 46 is provided with suitable stop means which limits forward and rearward travel of the track 46. For example, the clevis 74 acts as a stop member relative to the lower front roller 54 to limit rearward movement of the track 46.

Further, it is to be understood that the support and actuating assembly 44 is shown at only one spanwise location of the wing 10. It is to be understood that there are similar assemblies 44 at other spanwise locations along the length of the wing 12. The roller/drive members 62 at these various spanwise locations can be interconnected by a drive shaft so as to be driven from a common power source.

In operation, to move the assembly 10 from the upper cruise position of FIG. 1, the roller/drive member 62 is rotated clockwise, as seen in FIG. 1. This causes the cam track 46 to travel in a path generally following (but deviating somewhat from) the arc approximated by the arcuate axis 80 of the track 46, so that the instantaneous center of rotation of the track 46 and the nose section 22 remains reasonably close to the center of curvature 82 of the axis or arc 80, but moves relative to the center 82. When the support and drive assembly 44 reaches the intermediate position of FIG. 3, the nose section 22 has moved downwardly and moderately rearwardly, and also has rotated so that it is at more of a downward and forward slant. In the particular configuration of FIG. 3, the amount of rotation from FIG. 1 is 20°. Further, at this location the movement of the nose section 22 has been such so that the forward part 30 and the rear part 32 of the skin panel 28 have moved moderately closer to one another so as to place the flexible intermediate portion 36 of the panel 28 in a rather moderate curve, as shown in FIG. 3. This curvature is such that it forms a proper aerodynamic contour of the upper skin section extending from the nose section 22 to the location of the forward spar 20. Further clockwise rotation of the roller/drive member 62 causes the cam track 46 to move further rearwardly so as to deflect the nose section 22 yet further downwardly to the 38.5° deflected position of FIG. 5.

Figure 7:
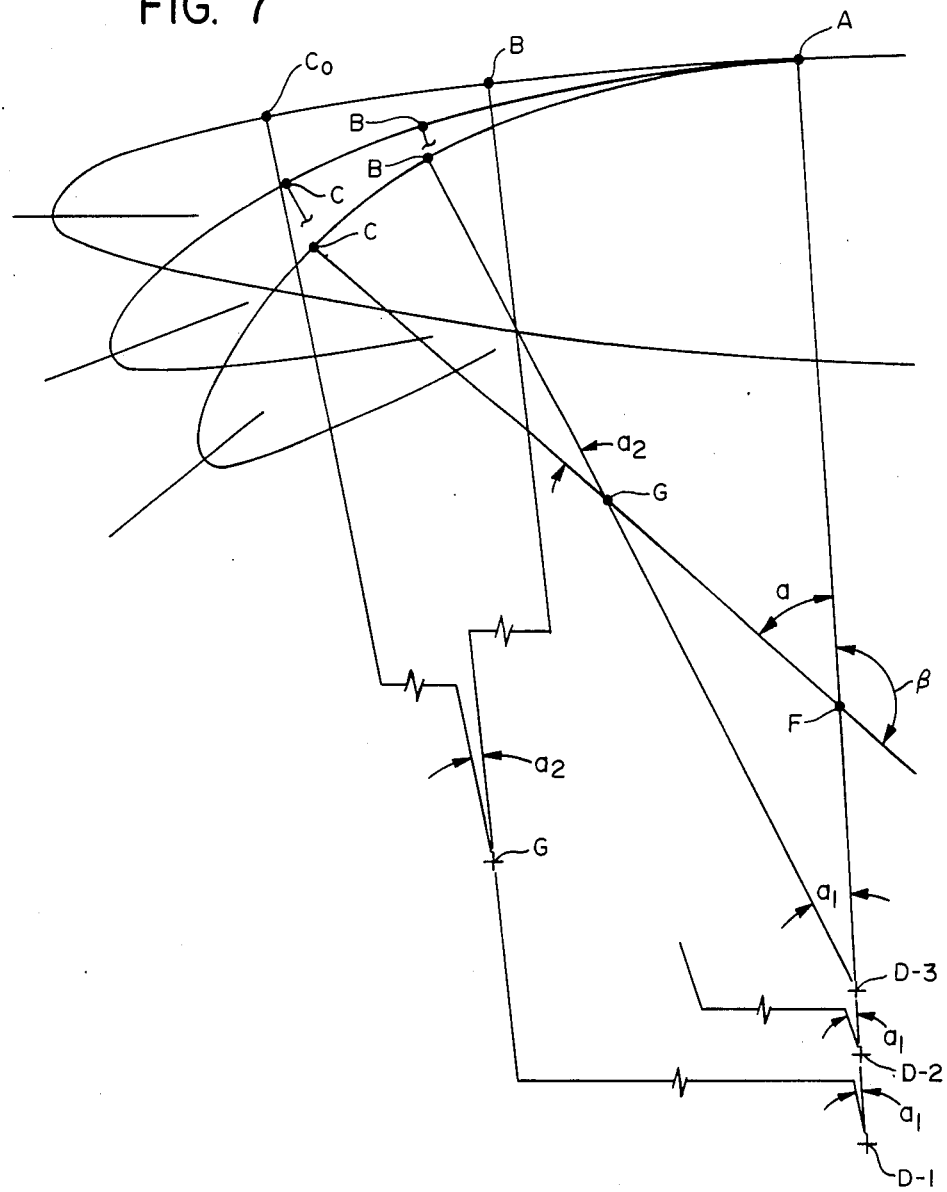
FIG. 7 is a schematic view of the outer contours of the leading edge assembly, illustrating various angles of curvature for different positions of the leading edge assembly.

Reference is now made to FIG. 7, which illustrates somewhat schematically the results of an analysis of the changing geometry of the flexible upper skin panel 28 during the downward deflection of the nose section 22. The points A and C are at, respectively, the rear and forward portions of the bendable panel section 28, while the point B is a variable intermediate point.

Certain radii and angles of curvature are illustrated in FIG. 7, and these were determined by an iterative solution to simultaneous equations involving the panel length and tangency at all three points, A, B, and C, these equations being the following:

(a) Constant arc length of $ACo$.

$$\alpha_1 = \frac{\stackrel{\frown}{AC} k - \alpha R_2}{R_1 - R_2}$$

(b) Common radial (BGD) at intersection of $R_1$ and $R_2$.

$$\alpha_1 = \stackrel{\frown}{TAN} \frac{(R_2 - CF) \sin\beta}{AF - R_1 - \cos\beta (R_2 - CF)}$$

(c) The vertical component of arc AB plus that for arc BC equals the vertical coordinate of point C.

$$\alpha_1 = \stackrel{\frown}{\cos} \left( \frac{Z_c + R_2 \cos\alpha - R_1}{R_2 - R_1} \right)$$

where:
$ACo$. is equal to the arc distance from point A to point Co. (which arc distance remains constant throughout movement of the assembly).
$\alpha_1$ is equal to the angle formed by the radii extending from points A and B (this angle being shown for three different positions of the leading edge assembly)
$AC$ is the arc distance from point A to point C.
$k$ is a constant which equals to $360/2\pi$
$\alpha$ is equal to the angle formed by the radii drawn from point A and point C.
$R_2$ equals the distance from G to B (which is the same as the distance from G to C).
$R_1$ equals the distance from point A to point D (with point D being shown at three different locations, namely D-1, D-2 and D-3).
$CF$ is equal to the distance from point C to point F.
$AF$ is equal to the distance from point A to point F.
$Z_c$ is equal to the vertical distance of the point C below the point A.

FIG. 7 is not intended to give the precise results of the analysis, but rather to indicate the nature of the angular relationships that were studied. This analysis indicates that throughout not only the three positions shown on FIG. 7, but also throughout the other intermediate positions, the curvature of the upper panel 28 produces the desired aerodynamic contour.

To explain more fully how this is accomplished in the present invention, reference is now made to FIG. 9, which is a schematic illustration of the geometry of the track 46, relative to the cam rollers 52, 54 and 60, and also relative to the cam roller 68 of the roller/drive member 62. The respective centers of rotation of these members 52, 54, 60 and 68 are designated by the letters "L", "M", "N" and "H".

In the illustration of FIG. 9, the assumption has been made that the track 46 and the nose section 22 remain stationary, while the rollers 52, 54 and 60 and also the roller/drive member 62 are the movable members. The paths of the various center points, L, M, N, and H are shown at the 0° deflected position (with a "0" suffix designating that location), and also at the fully deflected position (where a "38.5" suffix designates that fully deflected location). Also, the circular arc 80 has been illustrated in FIG. 9 to provide a visual comparison with the deviations of the track 46 from a true circular curve.

It can be seen that the forward cam track portion 48 has its upper and lower surfaces 56 and 58 deflected radially outwardly from the center of curvature 82 of the arc 80. The path of the four center points, H and L-N, are illustrated by a series of "x" points which show instantaneous locations of these four centers H and L-N for various angular deflections of the assembly 10.

The instantaneous center of rotation of the centers of the rollers 52, 54, 60 and the cam surface 68 relative to the track 46 is designated "E", and at the 0° position, the location of E is designated $E_0$. During the travel from approximately the 0° position to about the mid-deflection point (i.e. at about 18°-20° deflection), the instantaneous center of rotation $E_0$ of these components 52, 54, 60 and 68 moves slightly downwardly and forwardly to the location indicated at E1. During the latter half portion of travel (i.e. from the 18°-20° position to the full 38.5° deflected position), the instantaneous center of rotation of these components moves back to the initial position indicated at $E_0$.

These various locations are presented in the Table of FIG. 10, which gives these various locations of the points E, H, L and M in terms of vertical and horizontal coordinates. A numerical increase along the Z axis indicates downward movement, while a numerical increase along the X axis indicates a forward movement.

From the above discussion, it can be recognized that as the cam track 46 moves along its circumferential or arcuate axis 80, the track 46 will have what might be described as a moderate rocking movement (about point $H_o$). This rocking movement is such that the point of tangency 96 of the roller/drive member 62 rotates moderately clockwise about point $H_o$.

It has been found that with the arrangement illustrated in FIG. 9, the movement of the nose section 22 is such that the upper skin panel 28 is continuously flexed to the desired aerodynamic contour for all positions. Further, the geometry of this mechanism introduces no tensile or compression forces into the plane of the upper skin panel 28, but only the bending moments due to flexing. Further, this contouring of the panel 28 is accomplished with the nose section 22 following a path that allows the cam track 46 to always remains in proper driving engagement with the roller/drive member 62.

Another facet of the present invention will now be described with reference to FIGS. 2, 4 and 6, which show the locating device 45 in three different positions, namely, the 0° position of FIG. 2, the 20° deflected position of FIG. 4, and the 38.5° deflected position of FIG. 6. This device 45 comprises a support beam or locating arm 100 pivotally connected at its forward end 102 to an upper rear portion of the nose section 22. The rear end of the arm 100 has a cam roller 104 that rides in a cam 106 of a cam support member 108.

There is a panel support or locating link 110 which has a lower end pivotally connected at 112 to the arm 100 at a location slightly behind the midlength thereof. The upper end 114 of the link 110 is pivotally connected to a spanwise stiffener 116 which, in cross-sectional configuration, comprises two right angle members joined to each other. This stiffener connects to the inside surface of the panel 28.

It can readily be appreciated that the precise location of the arm 100 is at all times controlled by the position of the nose section 22 and the programming of the cam 106. Thus, the locating link 110 will always be properly located to position its connecting point 114 to the stiffener 116 at the proper location to obtain the desired aerodynamic contour of the upper skin panel 28.

While the present invention is particularly adapted to be used in, and to uniquely resolve the problems of, a variable camber leading edge assembly of an airfoil, within the broader aspects of the present invention, it could be utilized in other arrangements relative to an airfoil or similar device. Specifically, in the following claims, it is to be understood that while this assembly is recited as a leading edge assembly, the term "leading edge assembly" is to be interpreted broadly enough to refer to an assembly positioned at the trailing edge of an airfoil, in which case the terms "forward" and "rear" would be reversed within the meaning of the claims. Also, it is to be understood that various modifications could be made without departing from the basic teachings of the present invention.

I claim:

1. A leading edge assembly for an airfoil having an upper surface, a lower surface, a leading edge and a trailing edge, said assembly comprising:
    a. a main support structure for the airfoil;
    b. a nose section at said leading edge;
    c. an upper skin panel having a rear part connected to said structure, a forward part connected to said nose section, and an intermediate flexible panel portion extending between the rear part and the forward part;
    d. support and actuating means operatively connected between the nose section and the support structure to move the nose section about a general center of rotation between a first upper position where the flexible panel portion has a lesser degree of curvature and said nose section is more horizontally aligned, to a second lower position where the flexible panel portion has a greater degree of curvature and the nose section is aligned in a more downward slant, in a manner that curvature of the flexible panel portion increases with movement of the nose section toward its second position, said support and actuating means comprising:
        (1) a cam track having a forward end connected to said nose section and having a lengthwise axis curved in a generally arcuate configuration about said general center of rotation;
        (2) a cam track contact means connecting to said support structure and comprising a forward contact portion and a rear contact portion engaging said cam track at spaced locations along the lengthwise axis to restrain angular movement of the cam track relative to the cam track contact means;
        (3) said cam track having a forward cam track section engaging the forward contact portion for travel along a path having a forward and upward slant, and a rear cam track section engaging the rear contact portion for travel along a path having an upward and rearward slant;
    f. a rotatably mounted drive gear member engaging said cam track at a drive location which is adjacent to and radially outwardly of said rear cam section relative to the general center of rotation;
    g. the lengthwise axis of the cam track at the forward cam track section deviating at least partly from a true circular arc, in a manner that said general center of rotation shifts during movement of the nose section between the first and second positions, whereby a proper aerodynamic contour of said upper skin panel can be maintained.

2. The assembly as recited in claim 1, wherein said drive gear member is adjacent said rear contact portion.

3. The assembly as recited in claim 2, wherein said rear cam track section comprises a gear segment engaging said drive gear member, said gear segment being arranged in a circular arc.

4. The assembly as recited in claim 3, wherein said rear contact portion comprises a lower contact member rotatably mounted about an axis of rotation coincident with an axis of rotation of said drive gear member, said contact member engaging a radially outward surface of the rear cam track section.

5. The assembly as recited in claim 4, wherein the forward section of the cam track has a forward portion, a middle portion, and a rear portion, the middle portion of the forward section deviating from the arcuate configuration of the lengthwise axis of the cam track in a direction radially outwardly from the general center of rotation.

6. The assembly as recited in claim 2, wherein said rear contact portion comprises a lower contact member rotatably mounted about an axis of rotation coincident with an axis of rotation of said drive gear member, said contact member engaging a radially outward surface of the rear cam track section.

7. The assembly as recited in claim 1, wherein the forward section of the cam track has a forward portion, a middle portion, and a rear portion, the middle portion of the forward section deviating from the arcuate configuration of the lengthwise axis of the cam track in a direction radially outwardly from the general center of rotation.

8. The assembly as recited in claim 1, wherein:
 a. the forward contact portion comprises upper and lower cam rollers engaging upper and lower cam surfaces of the forward cam track section;
 b. the rear contact portion comprises upper and lower cam rollers engaging, respectively, upper and lower cam surfaces of the rear cam track section;
 c. the drive gear member is mounted on an axis of rotation coincident with an axis of rotation of the lower cam roller of the rear contact portion;
 d. the forward section of the cam track has a forward portion, a middle portion, and a rear portion, the middle portion of the forward section deviating from the arcuate configuration of the lengthwise axis of the cam track in a direction radially outwardly from the general center of rotation.

9. The assembly as recited in claim 8, wherein there is locating means comprising a locating member having first and second end portions, said first end portion being pivotally connected to one of the nose section and the main support structure, said second end portion being operatively connected to cam means arranged to move the second end portion along a predetermined path as the nose section moves between its first and second positions, said locating means further comprising a locating link operatively connected between said locating member and said upper skin panel at a location intermediate the forward and rear parts of the skin panel.

10. The assembly as recited in claim 9, wherein the first end of the locating member is pivotally connected to the nose section, and the second end of the locating member is connected to a cam member defining a cam path operatively engaging a matching cam member connected to the second end of the locating member, said cam member being connected to the main support structure.

11. The assembly as recited in claim 1, wherein there is locating means comprising a locating member having first and second end portions, said first end portion being pivotally connected to one of the nose section and the main support structure, said second end portion being operatively connected to cam means arranged to move the second end portion along a predetermined path as the nose section moves between its first and second positions, said locating means further comprising a locating link operatively connected between said locating member and said upper skin panel at a location intermediate the forward and rear parts of the skin panel.

12. The assembly as recited in claim 11, wherein the first end of the locating member is pivotally connected to the nose section, and the second end of the locating member is connected to a cam member defining a cam path operatively engaging a matching cam member connected to the second end of the locating member, said cam member being connected to the main support structure.

* * * * *